(12) United States Patent
Bluhm

(10) Patent No.: US 9,238,429 B2
(45) Date of Patent: Jan. 19, 2016

(54) SLIDING PLATFORM WITH DUAL BRAKING

(75) Inventor: Jason A Bluhm, Townsend (CA)

(73) Assignee: Cargo Ease Inc. (CA)

( * ) Notice: Subject to any disclaimer, the term of this patent is extended or adjusted under 35 U.S.C. 154(b) by 322 days.

(21) Appl. No.: 13/317,406

(22) Filed: Oct. 18, 2011

(65) Prior Publication Data

US 2013/0094929 A1    Apr. 18, 2013

(51) Int. Cl.
*B60P 1/00* (2006.01)
*F16D 63/00* (2006.01)

(52) U.S. Cl.
CPC ............... *B60P 1/003* (2013.01); *F16D 63/008* (2013.01)

(58) Field of Classification Search
CPC .................................................. F16D 63/008
USPC .................................. 414/522; 188/43, 82.8
See application file for complete search history.

(56) References Cited

U.S. PATENT DOCUMENTS

| | | | | |
|---|---|---|---|---|
| 3,194,349 A | * | 7/1965 | Kershner et al. | 188/72.7 |
| 3,768,673 A | * | 10/1973 | Nydam et al. | 414/522 |
| 4,685,857 A | * | 8/1987 | Goeser et al. | 414/522 |
| 4,705,315 A | * | 11/1987 | Cherry | 296/37.1 |
| 4,909,558 A | * | 3/1990 | Roshinsky | 296/37.6 |
| 5,052,878 A | * | 10/1991 | Brockhaus | 414/522 |
| 5,544,998 A | * | 8/1996 | Malinowski | 414/522 |
| 5,938,262 A | * | 8/1999 | Mills | 296/26.09 |
| 5,988,722 A | * | 11/1999 | Parri | 296/26.09 |
| 6,065,792 A | * | 5/2000 | Sciullo et al. | 296/26.09 |
| 6,398,283 B1 | * | 6/2002 | Knudtson et al. | 296/26.09 |
| 6,659,524 B1 | * | 12/2003 | Carlson | 296/26.09 |
| 6,921,120 B1 | * | 7/2005 | Ervin | 296/26.02 |
| 7,219,793 B2 | * | 5/2007 | Robertsson et al. | 188/82.8 |
| 7,445,263 B1 | * | 11/2008 | Bluhm | 296/26.09 |
| 8,296,878 B2 | * | 10/2012 | Imhoff | 188/43 |

* cited by examiner

*Primary Examiner* — James Keenan
(74) *Attorney, Agent, or Firm* — Harness, Dickey & Pierce, P.L.C.

(57) ABSTRACT

A braking apparatus is described which is used to control the motion of a sliding platform of a pickup truck in order that the sliding platform may be stopped anywhere along its travel for convenience. The sliding platform is used to load and unload freight from the pickup truck when in an extended position at the rear of the truck. When the truck is parked on ground which is uneven the sliding platform is provided with energy which must be dissipated when it is moved from one position to another. When the usual braking device is released (usually a pin located appropriately in the tracks of the platform members) the sliding platform is in a "runaway" condition. The brake described here is capable of preventing this condition.

8 Claims, 3 Drawing Sheets

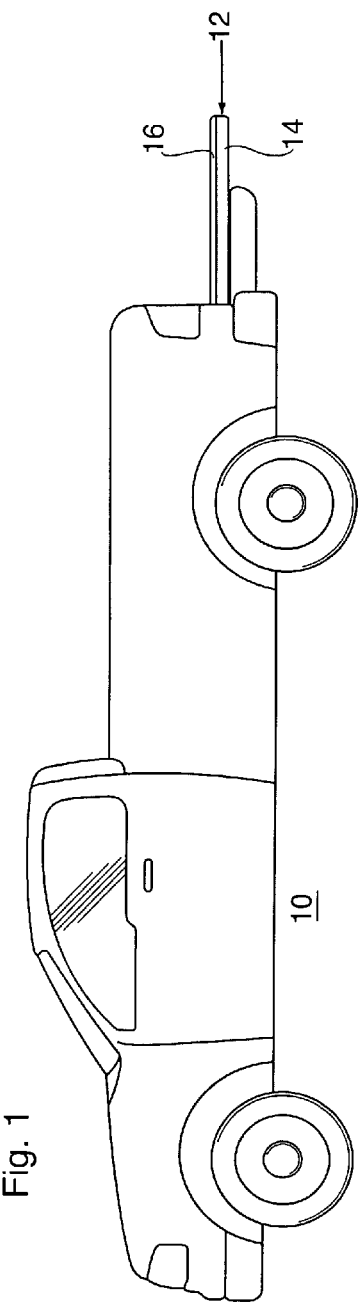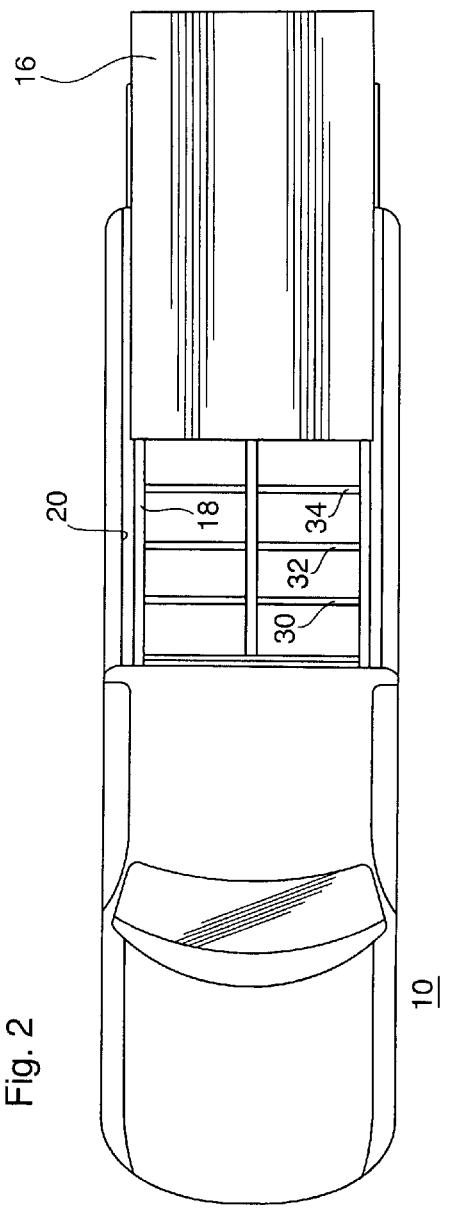

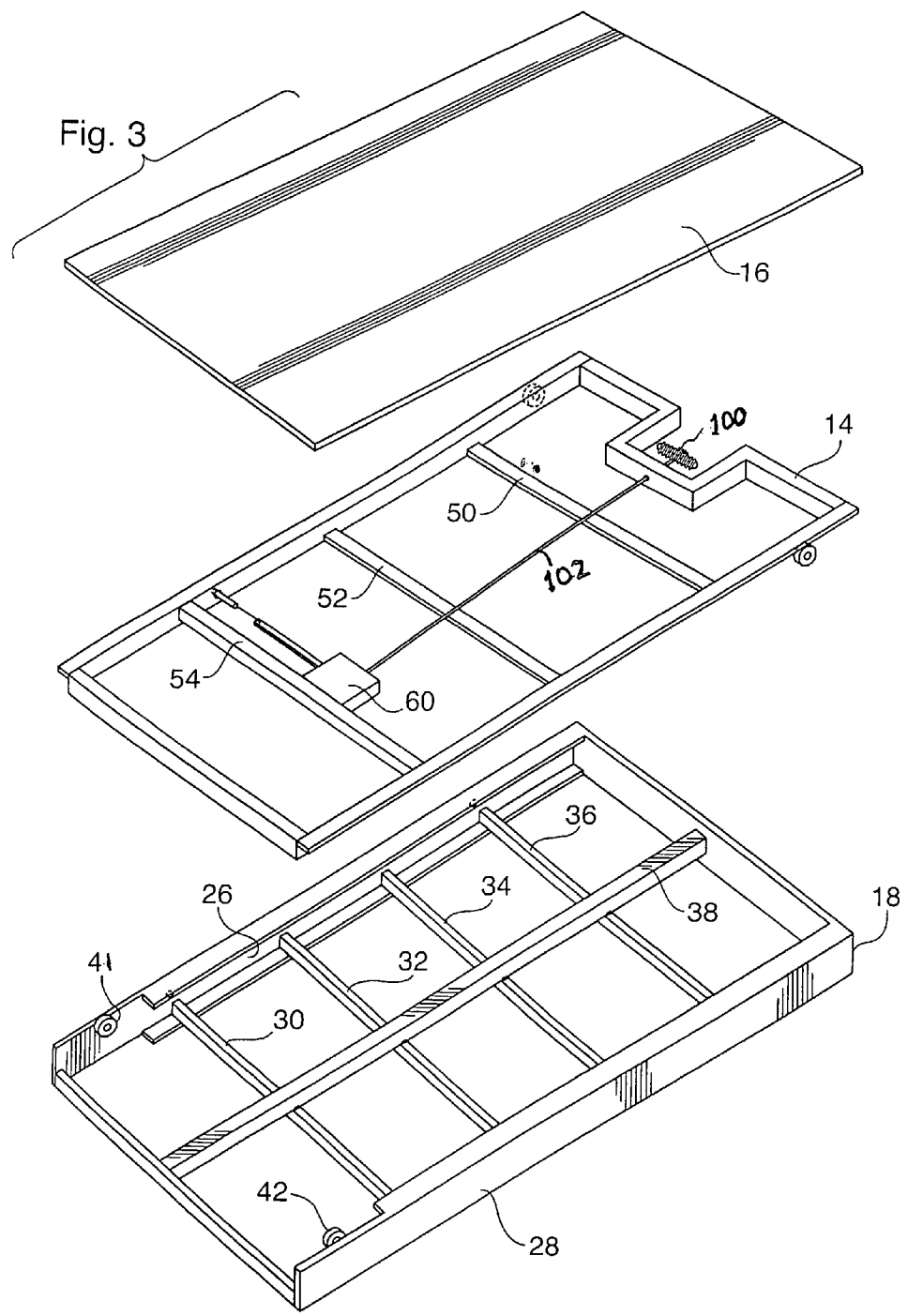

SLIDING PLATFORM WITH DUAL BRAKING

BACKGROUND OF THE INVENTION

The pickup truck is the motor vehicle of choice when it comes to moving items which must be loaded and transported a short distance. More and more it is seen that vehicles are equipped with sliding platforms that are permanently installed in the cargo carrying space are called upon for service of such freight.

It is not impossible that the vehicle in which the sliding platform is installed will be called upon to work on a sloping surface when it is desired to load or unload freight into or out of the vehicle. This causes the standard sliding platform to be difficult to move and when released the platform moves with such energy that in almost an instant it is in a "Runaway" condition. It is to solve situations such as the one described above that this invention was made.

The standard sliding platform is provided with several "hard" stops (at least two) located at points along its travel. These are points are set permanently by apertures in the stationary mounted hardware where the sliding platform essentially can lock into any of these apertures. When the handle of the sliding platform member is actuated to release the sliding platform, it is not known how much energy is going to be released or absorbed by the sliding platform and the freight it is carrying. It is left to the operator to "guess" the amount of energy contained by such a maneuver.

When freight is to be loaded, the load must be lifted up until it is placed on the sliding platform and the sliding platform is moved to its "stored" position, locked in place, where the freight may safely carried during periods when the motor vehicle is powered to move the vehicle and the load on the sliding platform.

When the load has reached its destination, it must be unloaded using the sliding platform mounted in the cargo carrying area of the vehicle. The operator generally searches out a level area on which he parks the vehicle, and proceeds to unload the freight. Often, there will be no level area available, and the operator has no choice but to unload the freight in the sloping area (although it may be most unsatisfactory). The operator will generally summon all the help he can obtain to unload the freight on the sliding platform. He instinctively knows that he will need help to steady the sliding platform and let down the freight gently from the extended sliding platform in the area chosen.

If there is no help available the operator has little choice but to unload the freight the best way he knows how. And that may involve damage to the freight or injury to the operator, both of which cannot be tolerated by management.

SUMMARY OF THE INVENTION

It is to prevent such situations as that described above that this invention is directed. A brake is added to the sliding platform so that it may be better controlled when the sliding platform is released from its locked position. The brake is chosen to be able to dissipate the amount of energy contained by the sliding platform and the freight carried on it.

BRIEF DESCRIPTION OF THE DRAWINGS

FIG. 1 is an elevational view of the vehicle on which the device is mounted;

FIG. 2 is plan view of the vehicle on which the device of applicant's invention is mounted;

FIG. 3 is an exploded perspective view of the device showing applicant's invention;

DESCRIPTION OF THE PREFERRED EMBODIMENT OF THE INVENTION

Figure 4:
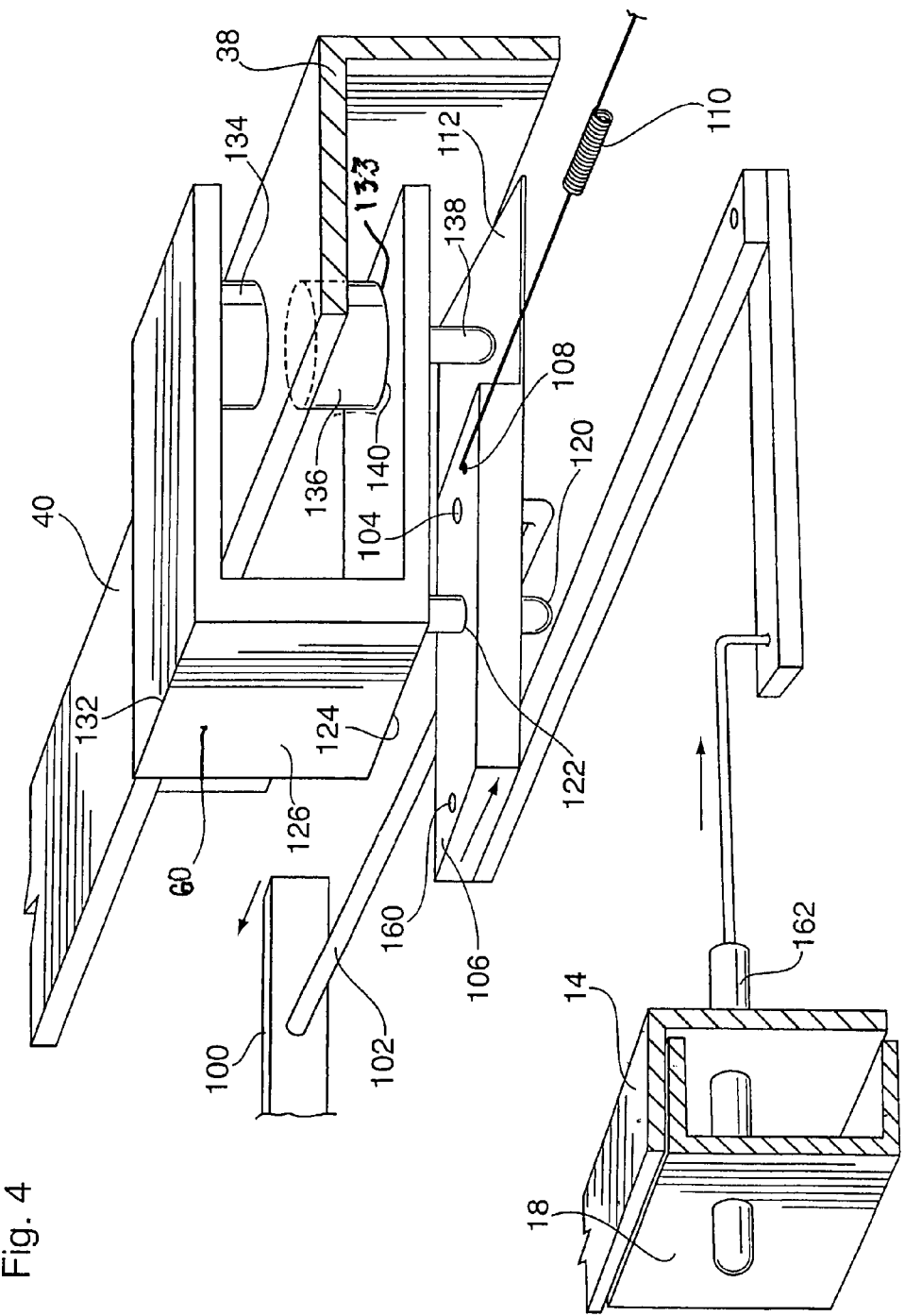
FIG. 4 is a view of applicant's brake (without any casing being shown).

Referring now to FIG. 1 a pickup truck 10 is shown in elevation having a rolling or sliding platform assembly 12 mounted thereon. The assembly 12 consists of a sliding platform frame 14 having a flat top 16 (plywood) for transporting items of freight on it.

FIG. 2 shows the same truck in plan view. Here the truck 10 is shown having device 12 (not shown) for rolling on the stationary frame member 18. Stationary frame member is 18 mounted by any convenient means in the cargo carrying space 20 of truck 10. It matters not how the rolling or sliding platform member 14 rolls on the stationary frame member 18, as long as sliding platform member 14, is confined to rolling on the rails 26 and 28 (see FIG. 3) of the stationary member 18 in a predetermined manner.

FIG. 3 shows the sliding platform 12 in which parts of the sliding platform 12 are "exploded" to better illustrate applicant's invention.

The stationary frame 18 is permanently mounted in the cargo carrying space 20 of the vehicle 10 as previously stated. Stationary frame member 18 has a plurality of cross supports 30, 32, 34 and 36 (added for strength) extending across the structure 18. A brake beam 38 (in this instance) is formed from a piece of angle iron and is attached to horizontally extending cross supports 30, 32, 34 and 36 by welding or any other suitable method of attaching. Wheels such as 41 and 42 are mounted on frame 18 as shown.

The sliding platform frame 14 is of an irregular shape to accommodate the baking apparatus 60 and the handle 100 of the tripping mechanism of this invention. The frame 14 also accommodates cross pieces 50, 52, and 54 to add stability and strength to the frame 14.

Braking device 60 is mounted on cross member 54. Braking device 60 is mounted on cross member 54 so that it is able to "squeeze" the protruding part 40 of angle iron member 38 and to arrest any motion of the sliding member 14.

Reference is now made to FIG. 4. Here a handle 100 of actuator rod 102 is completely shown. The actuator rod 102 is shown here as a rod but other methods of actuation are possible. Actuator rod 102 terminates in aperture 104 in lever 106.

Another aperture 108 is provided in lever 106 for the attachment of spring 110 thereto. The brake is automatically applied when the lever bearing ramp 112 is moved in a clockwise direction by the application of force. Spring 110 is designed to supply such force.

Lever 106 is provided with an aperture 122 to allow lever 106 to pivot about pivot 120. Pivot 120 is mounted on the lower surface 124 of caliper 126 of brake mechanism 60. Brake mechanism 60 consists of caliper 126 which houses the pads 134 and 136 of the brake mechanism 60. Brake pad 134 is stationary while pad 136 is movable by movement of pin 138 which rests on ramp 112 of lever 106. Because brake pad 136 is movable it is provided with a steel backing plate 14 mounted there on.

Another pivot point 160 is provided in lever 106 and this serves as an actuator to retract or engage pin 162 between the stationary member 18 and the movable member 14 to prevent or permit locking of the sliding member 14 to member 18.

When it is desired to unlatch the sliding or rolling device 14 from the permanently mounted stationary frame member 18, the handle 100 is grasped and pulled. This releases the pin 162 from its "locked" position and pivots lever 106 in the counter clockwise direction so that ramp 112 moves to release pin 136 from its "squeeze" position to its "release" position. This allows the sliding or rolling member 14 to move. When it is wished to re-engage the action of the brake 60, all that is required is that handle 100 be released so that spring 110 applies sufficient tension to lever 106 to re-apply brake 60.

If it is desired to align pin with an existing hole in stationary frame member 18 the operator grasps handle 100 pulls it to release brake 60 and moves the rolling or sliding frame member 14 until the aperture in rolling member lines up with the desired aperture in stationary member 18

Many modifications and other embodiments of the invention will come to mind of one skilled in the art, having the benefit of the teachings presented in the foregoing description and the associated drawings. Therefor, it is to be understood that the invention is not to be limited to the specific embodiments disclosed, and that the modifications and embodiments are intended to be included within the scope of the dependent claims.

The invention claimed is:

1. A braking system for a pickup truck sliding platform comprising:
    a frame configured to be stationarily mounted within a pickup truck bed;
    a platform slidably coupled to the frame, the platform including a brake beam;
    a braking assembly mounted to the sliding platform, the braking assembly including:
        an upper flange and a lower flange, the brake beam is between the upper flange and the lower flange;
        an upper brake pad mounted to the upper flange;
        a lower brake pad mounted to the lower flange, a pin extends from the lower brake pad through the lower flange;
        a lever rotatably mounted to the lower flange, the lever rotatable from a start position in a first direction and a second direction opposite to the first direction, the lever including a ramped portion configured to contact the pin of the lower brake pad; and
        a handle connected to the lever to rotate the lever in the first direction;
    wherein:
        moving the handle rotates the lever in the first direction such that the pin slides down the ramped surface to cause the lower brake pad to move away from the upper brake pad and disengage the brake beam to permit the sliding platform to slide relative to the frame; and
        movement of the lever in the second direction slides the pin up the ramped surface to move the lower brake pad towards the upper brake pad and into engagement with the brake beam to prevent the sliding platform from moving relative to the frame.

2. The braking system of claim 1, further comprising a spring biased to maintain the lever in the start position, and rotate the lever in the second direction opposite to the first direction after the lever has been rotated in the first direction.

3. The braking system of claim 1, further comprising an actuation arm extending from the lever towards the frame and including a pin configured to be received by the frame to restrict movement of the platform relative to the frame;
    wherein rotation of the lever in the first direction decouples the pin from cooperation with the frame, and rotation of the lever in the second direction moves the pin towards the frame.

4. A braking system for a pickup truck sliding platform comprising:
    a frame configured to be stationarily mounted within a pickup truck bed, the frame including:
        a pair of spaced apart side rails extending parallel to each other; and
        a brake beam extending parallel to the pair of side rails;
    a sliding platform with a flat top panel rigidly secured thereto, the sliding platform including:
        side walls configured to slidably cooperate with the pair of spaced apart side rails of the frame; and
        a crossbeam extending between the side walls;
    a braking assembly mounted to the crossbeam of the sliding platform, the braking assembly including:
        a caliper having an upper flange and a lower flange, the caliper arranged such that the brake beam is between the upper flange and the lower flange;
        a stationary brake pad mounted to the upper flange;
        a movable brake pad mounted to the lower flange, a pin extends from the movable brake pad through the lower flange;
        a lever rotatably mounted to the lower flange, the lever rotatable in a first direction and a second direction opposite to the first direction, the lever including a ramped portion configured to contact the pin of the movable brake pad;
        a handle connected to the lever to rotate the lever;
    wherein moving the handle rotates the lever in a first direction such that the pin slides down the ramped surface to cause the movable brake pad to move away from the stationary brake pad and disengage the brake beam to permit the sliding platform to slide relative to the frame; and
    wherein movement of the lever in a second direction opposite to the first direction slides the pin up the ramped surface to move the movable brake pad towards the stationary brake pad and into engagement with the brake beam to prevent the sliding platform from moving relative to the frame.

5. The braking system of claim 4, wherein moving the handle includes pulling the handle.

6. The braking system of claim 4, further comprising a spring configured to move the lever in the second direction.

7. The braking system of claim 4, wherein the lever rotates in a plane extending substantially parallel to each of the upper flange and the lower flange.

8. The braking system of claim 4, further comprising an actuation arm extending from the lever towards the frame and including a pin configured to be received by the frame to restrict movement of the platform relative to the frame;
    wherein rotation of the lever in the first direction decouples the pin from cooperation with the frame, and rotation of the lever in the second direction moves the pin towards the frame.

* * * * *